United States Patent
Wootton et al.

(10) Patent No.: US 7,658,070 B2
(45) Date of Patent: Feb. 9, 2010

(54) METHOD AND APPARATUS FOR IMPROVING THE ENERGY CONVERSION EFFICIENCY OF ELECTRICAL POWER GENERATORS

(75) Inventors: John Wootton, St. Louis, MO (US); Asdrubal Garcia-Ortiz, Chesterfield, MO (US); Michael Duello, St. Louis, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 890 days.

(21) Appl. No.: 11/232,073

(22) Filed: Sep. 21, 2005

(65) Prior Publication Data
US 2007/0017223 A1 Jan. 25, 2007

Related U.S. Application Data

(60) Provisional application No. 60/611,664, filed on Sep. 21, 2004.

(51) Int. Cl.
*F02G 3/00* (2006.01)
(52) U.S. Cl. ............... 60/614; 60/616; 60/714; 60/719
(58) Field of Classification Search ............ 60/614, 60/616, 618, 714, 719
See application file for complete search history.

(56) References Cited

U.S. PATENT DOCUMENTS

| | | | |
|---|---|---|---|
| 4,463,214 A | 7/1984 | Lowther | |
| 4,470,476 A * | 9/1984 | Hunt | 180/65.2 |
| 4,753,682 A | 6/1988 | Cantoni | |
| 4,850,193 A * | 7/1989 | Kawamura | 60/608 |
| 4,886,978 A * | 12/1989 | Kawamura | 290/52 |
| 6,172,427 B1 | 1/2001 | Shinohara et al. | |
| 6,340,787 B1 | 1/2002 | Simeray et al. | |
| 6,460,360 B2 | 10/2002 | Hsieh | |
| 6,543,229 B2 * | 4/2003 | Johansson | 60/605.1 |
| 6,668,954 B2 | 12/2003 | Field | |
| 6,732,525 B2 | 5/2004 | Endoh et al. | |
| 6,740,439 B2 | 5/2004 | Ban et al. | |
| 6,748,907 B2 | 6/2004 | Malmquist et al. | |
| 7,012,554 B2 * | 3/2006 | Hiller et al. | 340/988 |
| 2003/0106316 A1 | 6/2003 | Endoh et al. | |
| 2004/0128041 A1 | 7/2004 | Hiller et al. | |

OTHER PUBLICATIONS

Hi-Z Technology, Inc., "Thermoelectric-Powered Water Heather," [online], retrieved Sep. 12, 2005 [http://www.hi-z.com/websit09.htm].

Hi-Z Technology, Inc., "Thermoelectric-Powered Pellet Stove," [online], retrived Sep. 12, 2005 [http://www.hi-z.com/websit11.htm].

Hi-Z Technology, Inc., "Demonstration Generator," [online] retrieved Sep. 12, 2005 [http://www.hi-z.com/websit20.htm].

(Continued)

*Primary Examiner*—Hoang M Nguyen
(74) *Attorney, Agent, or Firm*—Sonnenschein Nath & Rosenthal LLP

(57) ABSTRACT

An energy efficient electrical power generator has a primary energy conversion mechanism, such as an internal combustion engine, and a secondary energy conversion mechanism, such as a thermoelectric device. The secondary energy conversion mechanism increases the electrical power output and efficiency of the generator.

23 Claims, 2 Drawing Sheets

OTHER PUBLICATIONS

Hi-Z Technology, Inc., "Sample Applications of Hi-Z Thermoelectric Modules," [online] retrieved Sep. 12, 2005 [http://www.hi-z.com/websit06.htm].

Hi-Z Technology, Inc., "Development of Quantum Well Thermoelectric Device," [online] retrived Sep. 12, 2005 [http://www.hi-z.com/websit30.htm].

Brezonick, M., "10,000 and counting . . . milestone of 10,000th quiet tactical generator set highlights Fermont's design, packaging capabilities," Diesel Progress North American Edition, May 2005.

Green Car Congress, "DOE Authorizes Phase 2 of Thermoelectric Waste Heater Recovery Project," [online] retrieved Sep. 12, 2005 [http://www.greencarcongress.com/thermoelectrics].

Technology Venture Forum, Fall 2002, "Next-Generation Thermal Management Materials and Systems," [online] retrieved Sep. 12, 2005 [http://www.techventure.rti.org/prev_forums02.cfm?mnu=3&submnu=f2002-agenda].

Engineered Support Systems, Inc., "Operating Units—Engineered Electric/Fermont" [online] retrieved Sep. 13, 2005 [http://www.engineeredsupport.com/mainfermontproducts.htm].

Diesel Net, "Glossary of Terms [E-K]," [online] retrieved Sep. 13, 2005 [http:/www.dieselnet.com/gl-e.html].

Electronic Design, "Simple Buck-Boost Converter Shines in USB Applications," [online] retrieved Sep. 13, 2005 [http://www.elecdesign.com/Articles/Index.cfm&AD=I&ArticleID=7657].

Hi-Z Technology, Inc., "Power Generating Modules," [online] retrieved Sep. 12, 2005 [http://www.hi-z.com].

Hi-Z Technology, Inc., "Abstracts of Recent Hi-Z Technical Papers," [online] retrieved Sep. 12, 2005 [http://www.hi-z.com/websit30.htm].

"The Changing Structure of the Electric Power Industry 2000: An Update—Chapter 3," [online] retrieved Sep. 7, 2005 [http://www.eia.doe.gov/cneaf/electricity/chg_stru_update/chapter3.htm].

Natural Gas, "Combined Heat and Power Systems," [online] retrieved Sep. 7, 2005 [http://www.naturalgas.org/overview/combinedheat_powersystems.asp].

Babcock & Wilcox, "Babcock & Wilcox and Nooter/Eriksen Establish Heat Recovery Steam Generator Alliance," [online] retrived Sep. 7, 2005 [http://www.babcock.com/pgg/pr/nooter_bw.html].

* cited by examiner

METHOD AND APPARATUS FOR IMPROVING THE ENERGY CONVERSION EFFICIENCY OF ELECTRICAL POWER GENERATORS

CROSS REFERENCE TO RELATED APPLICATIONS

This application claims the benefit of U.S. Provisional Patent Application No. 60/611,664, filed Sep. 21, 2004, the entire contents of which is incorporated herein by reference.

BACKGROUND OF THE INVENTION

1. Field of the Invention

The invention generally provides for systems and methods of converting to electrical energy the rejected thermal energy of an electrical power generator. More particularly, an embodiment of the invention utilizes a mechanism such as that of a Seebeck device or Stirling engine to convert to electricity the wasted heat of combustion from a combustion-powered electrical power generator.

2. Description of Related Art

In recent years, relatively small, generally portable, electrical power generators powered by petroleum-based, liquid fuel, internal combustion engines have undergone a technological evolution that has significantly increased the efficiency of power generation in situations where the generator load is less than the nominal full load of the generator. That is, traditional constant speed generators have evolved into variable speed generators. Under reduced load requirements traditional constant speed electrical power generators are particularly inefficient because they maintain an engine speed designed for nominal full load output, even though the full load output is not needed. The development of variable speed generators has allowed the engine speed to change in response to the needed electrical output, resulting in significant gains in the overall efficiency of electrical power generators.

A variable speed generator 102 of the prior art is shown in FIG. 1. In general terms, for either a traditional, constant speed generator or a variable speed generator as shown in FIG. 1, the shaft 120 of internal combustion engine 105 drives an alternator 106, which produces alternating current (AC) electrical energy 122 from the rotational motion of the engine. For a variable speed generator 102, however, efficiency is improved over that of a constant speed generator by changing the speed of the engine 105 as the load on the generator 102 changes. The engine speed adjustment is effected in a manner that achieves the maximum possible efficiency from the engine 105 for all loads. By using this variable speed technology the AC voltage produced by the alternator 106 will have varying frequency since the frequency is determined by the number of poles in the alternator and the rotational speed of the shaft. In order to provide a constant AC voltage output from the variable speed generator 102, the alternator voltage output is first converted to a direct current (DC) voltage 124 by a rectifier 107. The DC voltage is then converted to a constant frequency AC voltage output 126 by an electrical power inverter 108. Typical AC voltage frequencies are 50 Hz, 60 Hz and 400 Hz. The variable speed generator, as just described, enables a significant enhancement in generator efficiency for applications in which load levels vary over time.

An example variable speed generator that has achieved significant success is the MEP-831A 3 kW gen-set sold to the U.S. military by Fermont. This generator uses a 7-hp, one cylinder engine that runs at 3600 rpm and is coupled to a permanent magnet alternator paired with an electronic inverter to deliver 120V/60 Hz electrical power. The engine operates using either diesel or JP-8 fuel. (Fuels meeting a "JP" standard are commonly used in avionics applications and are therefore often available to a military that relies on aircraft transportation, which makes very convenient the ability to run the generator on this type of fuel.) This generator is stable against the rigorous environmental demands of military field use. A military generator may need to operate at an elevation as high as 10,000 feet to 14,000 feet or higher, and at temperatures as low as 0° F. to −20° F. or lower and as high as 90° F. to 120° F. or higher. The MEP-831A generator is packaged into a man-portable (as this term is generally used by the U.S. military) unit that weighs about 300 pounds, since portability is important in military applications.

While variable speed generators have provided increased efficiency, the conversion of the chemical energy contained, for example, in petroleum based liquid fuels to electrical energy by a generator that is powered by an internal combustion engine is a relatively low efficiency process. Internal combustion engine (ICE) driven electrical power generators operate at efficiency levels on the order of 20-30%. In operating an ICE driven generator, about 70% of the chemical energy content of the liquid fuel powering the ICE is lost to the environment as thermal energy. In any combustion process used to create electricity through mechanical connections, whether using an internal or external combustion engine based on gaseous, liquid or solid fuels, or any other combustion process, there will be significant energy losses due to the generation of thermal energy that is not captured and converted to electrical energy. Generally, only the mechanical energy that results from the expansion of the combustion product gases is harnessed by the engine 105 to produce the rotational motion that drives the alternator 106.

Whereas an ICE-powered electric energy generator is not designed to utilize thermal energy (which is in fact a waste product of the ICE), other energy conversion mechanisms can be used to produce electrical energy from the rejected thermal energy. One mechanism for generating electrical energy from thermal energy is a thermoelectric device that makes use of the Seebeck effect (a Seebeck device). The Seebeck effect occurs when two dissimilar materials are connected at two separate junctions so as to form an electrical circuit, and the two junctions are maintained at different temperatures. One junction between the two materials is maintained at a higher temperature than is the other junction between the materials. The higher temperature junction is termed the hot side; the lower temperature junction is called the cold side. Under these conditions an electrical current will naturally flow in the circuit. The Seebeck effect has been utilized to design solid state thermoelectric devices, which produce electrical power as a result of exposure to temperature differentials.

Another method of converting thermal energy to electrical energy is through the use of a Stirling engine. Stirling engines feature a system through which work is produced in a cycle of heating and cooling an enclosed fluid (usually a gas) that is connected to at least one piston. Such an engine can utilize any external heat source to convert thermal energy into mechanical energy, e.g., rotational motion, which can then be converted to electrical energy, as was described for the variable speed generator.

SUMMARY OF THE INVENTION

Partly in consideration of the desire for higher efficiency electrical energy production, generally the invention relates to the conversion to electrical energy of thermal energy rejected from any type of electrical power generator, no matter the primary mechanism underlying the generator's operation, nor how the heat is produced.

By combining the electrical power produced through conversion of rejected thermal energy (i.e., through a secondary electrical power production mechanism) with the electrical power generated from a primary mechanism that also produces the rejected thermal energy used by the secondary mechanism, an embodiment of the present invention boosts the total electrical power production of the primary generator, and therefore boosts the overall energy conversion efficiency of the primary generator as compared with the generator's operation under conditions wherein the same thermal energy (as utilized by the secondary mechanism) is released as waste to the environment and not converted to electrical energy. By using thermal energy that would otherwise be rejected by the primary generator, an embodiment of the present invention adds to the primary generator's electrical output without the necessity of adding to its energy input. By using a secondary mechanism to boost the electrical power output of the primary generator, a generator normally constrained by the Carnot limit, such as is a generator based on an internal combustion engine, can operate at a electrical power production level beyond the Carnot limit. Thus, for example where the primary mechanism is an internal combustion engine that produces electrical energy and may achieve an efficiency rate of 30% for such electrical energy production, the use of a secondary mechanism may boost the efficiency of the use of the fuel consumed by the engine to a level above about 30%, above about 35%, above about 40%, or above about 45%. In an embodiment, efficiency may be boosted up to about 100%.

Note that the mechanism of conversion of thermal energy to electrical energy is termed secondary only because it is dependent on waste heat produced by another (primary) mechanism of generating electricity. Note also that in an embodiment, the primary mechanism of generating electrical energy is designed primarily for the generation of electrical energy and is not part of a device in which the power output of the primary mechanism is used to generate mechanical energy used to move the generator. That is, for example, if the primary mechanism is an internal combustion engine, that engine is used for the purpose of generating electricity and is not a mechanism that provides power to move the engine, such as is the case with a vehicle (e.g., automobile) engine, which, although it may produce electrical power, provides the power to move the vehicle.

Thus, an embodiment of the invention is an energy efficient electrical power generator comprising a primary energy conversion mechanism for generating electrical energy, the primary mechanism converting only some of its input energy into electrical energy and also rejecting thermal energy; a secondary energy conversion mechanism for generating electrical energy through the conversion of at least some of the rejected thermal energy; and a means to combine the electrical energy output of the primary and the secondary energy conversion mechanisms to produce a generator output at a higher efficiency, when compared with the input energy, than can be done by the primary mechanism alone. In alternate embodiments, the primary energy conversion mechanism is either of an internal combustion engine or a Stirling engine, and the secondary energy conversion mechanism is either of a solid state thermoelectric device or a Stirling engine.

A further embodiment is an energy efficient generator for producing alternating current electrical power comprising a first electrical power generator that generates electrical energy through the combustion of a fuel, the first electrical power generator comprising an internal combustion engine that rejects thermal energy, an alternator, a rectifier, and an inverter; a solid state thermoelectric device that generates electrical energy, the thermoelectric device being thermally connected to the engine in a manner that allows heat transfer from the engine to the thermoelectric device; and an electrical circuit through which the electrical energy output from the thermoelectric device is combined with the electrical energy output from the first electrical power generator; wherein the efficiency of conversion to electrical energy of the chemical energy present in the fuel combusted by the internal combustion engine is about 30% to about 100%, when considering the electrical power produced by both of the first electrical power generator and the thermoelectric device. In such an embodiment the electrical circuit may combine DC electrical energy from the rectifier with DC electrical energy from the thermoelectric device. In an alternate embodiment, the thermoelectric device has a hot side and a cold side, and the hot side of the thermoelectric device is in direct contact with one of an external surface of the engine, an engine block of the engine, a cylinder head of the engine, a coolant-fluid jacket of the engine, an exhaust manifold of the engine, a coolant-fluid of the engine, or an exhaust gas of the engine. In a further embodiment, the first generator is a variable speed generator. In an alternate embodiment the thermoelectric device is a quantum well thermoelectric device. In a still further embodiment the internal combustion engine operates using any one of diesel fuel, a fuel meeting a "JP" standard, or both; or bio-fuel.

In an embodiment of the invention, the energy efficient generator is designed to be transportable. In an alternate embodiment the energy efficient generator is designed to be man-portable. In a still further alternate embodiment, the energy efficient generator is capable of producing a sustained output of between about 1 kW and about 10 MW of electrical power, or between about 1 kW and about 100 kW, or between about 100 kW and about 1 MW, or between about 3 kW and about 60 kW of electrical power. The sustained output may be greater than about 1 kW, about 3 kW, about 10 kW, about 50 kW, about 100 kW, about 200 kW, about 500 kW, or about 1 MW; and less than about 10 MW, about 1 MW, about 500 kW, about 200 kW, about 100 kW, about 50 kW, about 10 kW, or about 3 kW. In an alternate embodiment, the energy efficient generator produces an alternating current output having a frequency of any one of 50 Hz, 60 Hz, or 400 Hz.

A further embodiment is a method of generating alternating current electrical power comprising the steps of providing an internal combustion engine powered genset; converting the mechanical energy of the engine into alternating current electrical energy; providing at least one solid state thermoelectric device thermally connected to the engine; converting thermal energy rejected from the engine into electrical energy through the thermoelectric device; and combining the electrical energy from the thermoelectric device with the electrical energy from the engine to produce alternating current electrical power. In an alternate embodiment this method further comprises the step of storing the electrical energy from the thermoelectric device in a battery; wherein the step of combining includes the use of a buck boost circuit to control electrical energy output from the battery. In an alternate embodiment this method further comprises the step of generating constant frequency alternating current electrical energy from direct current electrical energy, which direct current electrical energy is a combination of direct current electrical energy produced by the thermoelectric device and by the engine.

DETAILED DESCRIPTION OF PREFERRED EMBODIMENTS

Figure 2:
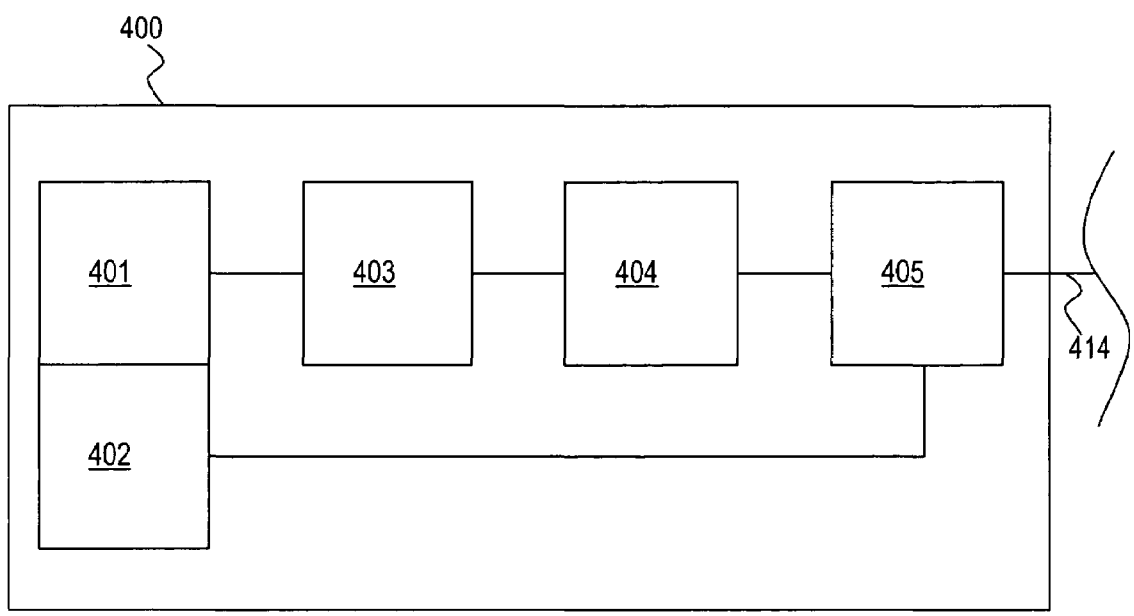
FIG. 2 shows a block diagram of an embodiment in which a thermoelectric device is used as part of an electrical power generator for conversion of heat to electricity.

An embodiment of the present invention has been designed to increase the electrical energy output of an ICE-powered electrical power generator by utilizing either a Seebeck device or a Stirling engine to convert into electrical energy the thermal energy that is produced, but not otherwise utilized, by the ICE. In a preferred embodiment, as shown in FIG. 2, the thermal energy rejected from internal combustion engine 401 of generator 400 is directly converted to DC electricity through thermoelectric device 402, said thermoelectric device 402 being in thermal contact with said engine 401. The burning of fuel in engine 401 creates heat that is converted to DC electrical energy in thermoelectric device 402 as a result of the Seebeck effect.

Figure 1:
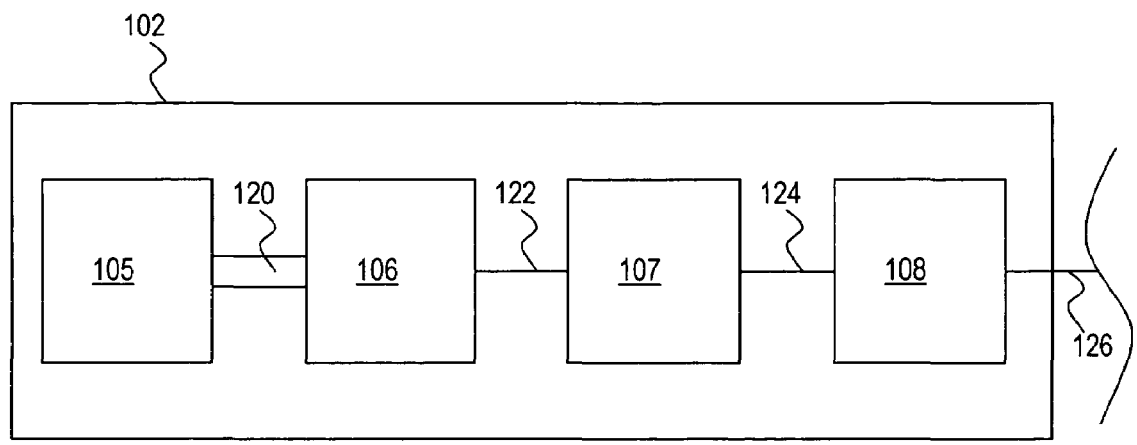
FIG. 1 shows a block diagram of a prior art variable speed generator.

Simultaneous with the conversion of heat to electricity in thermoelectric device 402, the generator 400 also produces electricity by the traditional method in which engine 401 uses a combustion process to convert fuel to rotary motion, which is converted to AC electrical energy by alternator 403. In this embodiment, as discussed above with respect to FIG. 1, the AC voltage is passed to rectifier 404 to convert the AC voltage to a DC voltage.

Then, the DC voltage output from both rectifier 404 and thermoelectric device 402 is passed to inverter 405, which generates a constant frequency AC voltage output 414. Thus, by converting the thermal energy rejected by engine 401 to electrical energy through use of the thermoelectric device 402, the total electrical energy generation of generator 400 is raised above that generated by the conversion to electricity of the rotational motion of engine 401 alone.

This increase in energy output is greatly simplified by the fact that it is performed through the combination of two DC power inputs. Thus, the advantage of increased generator efficiency gained through use of a device that captures and converts rejected thermal energy was made practicable in the context of an ICE generator by the development of the variable speed generator. As described above, in order for a variable speed generator to provide constant frequency electrical power, it must convert the AC power to DC power and then convert it back again to AC power (performed in the above described embodiment by the rectifier 404 and inverter 405, respectively). The presence of these conversion steps in a variable speed generator greatly simplifies the addition of electrical power from a secondary source, since the summation of DC electrical power is vastly less complicated than summation of two AC power sources. The constant frequency output of the alternator of a conventional, constant speed generator would have to be electrically manipulated in otherwise unnecessary steps in order to allow the addition of electrical power from a secondary source. It was an inventive recognition that the development of the variable speed generator allowed for a simplified system for the efficiency enhancement of the primary generator through the conversion to electrical energy of rejected thermal energy and the combining thereof with the electrical energy of the primary generator. Even where a secondary mechanism generates AC electrical energy, that energy can be converted to DC electrical energy for combination with the DC power output of the rectifier 404.

A specific example of an embodiment of this invention is an MEP-831A, 3 kW gen-set, as discussed above, modified with the addition of a set of thermoelectric devices to capture and convert to electrical energy the rejected thermal energy of the 7-hp diesel engine. In other examples, embodiments are made by modifying smaller or larger generators. In particular, a large diesel engine generator that produces about 1 MW of electrical energy or more is modified with the addition of a secondary mechanism for electrical energy production.

Useful embodiments include those that produce a sustained output of anywhere between about 1 kW and about 10 MW, and more specifically those that produce sustained output of anywhere between about 1 kW and 60 kW. Especially useful embodiments are those that are transportable, i.e., designed to be deployed and re-deployed at various locations, rather than being installed essentially permanently in a fixed location, and more specifically those that are man-portable.

Due to the complex nature of heat production and dissipation in all types of primary mechanisms for electrical energy generation, including but not limited to internal combustion engines, multiple configurations of the engine-thermoelectric device interface are encompassed by embodiments of the present invention. In a preferred embodiment, at least one thermoelectric device 402 is mounted on the exterior surface of an internal combustion engine 401 in a location near the combustion chamber where the heat is generated. Such a mounting could be on the engine block, cylinder head, coolant-fluid jacket, exhaust manifold, or on other locations of the engine 401, including any portion of the cooling system. In another embodiment, thermoelectric devices are mounted at multiple locations on the surface of the engine. In a further embodiment a thermoelectric device is manufactured to conform to the exterior surface of the engine. In this way, large portions of the engine's external surface, and even substantially all of the engine's external surface can be covered by one or more thermoelectric devices. In a still further embodiment, a thermoelectric device 402 is in contact with the interior of the engine, including the interior of a combustion cylinder or the exhaust system. Where multiple thermoelectric devices are used, the multiple outputs thereof are joined at, or prior to, a connection to the inverter 405.

Where the thermoelectric device 402 has been mounted on the external surface of the engine 401, the temperature differential needed for production of electrical energy by the thermoelectric device 402 is provided by the temperature difference between the engine surface, which is heated by the combustion powering the engine 401, and the ambient air surrounding the engine 401, or the generator 400. In an embodiment, the air about the engine 401 will be free to circulate and mix with the ambient air in the vicinity of the engine's location. In another embodiment a fan or other air circulating device may aid circulation of the ambient air, bringing colder air from outside the generator 400 toward the engine 401 as air heated by the engine 401 is moved away. Another embodiment attaches a finned heat sink to the cold side of the thermoelectric device to improve the cooling effect of the ambient air being moved by the air circulating device. Another embodiment uses heat pipes in thermal contact with the cold side of the thermoelectric device 402 and the ambient air outside the generator 400, to maintain the temperature of the cold side of the thermoelectric device closer to that of the ambient air. In a still further embodiment, the thermoelectric device 402 may be jacketed on the cold side by a liquid coolant, rather than by air. In an embodiment, a coolant jacketed thermoelectric device 402 is mounted in a location on the engine 401 between the engine block and the coolant-fluid jacket that is part of the engine's cooling system so that the thermoelectric device and the engine share a coolant system. Alternatively, a separate cooling system is provided for the one or more thermoelectric devices 402.

In embodiments as just discussed, a thermoelectric device 402 may be mounted on an engine 401 using various connecting methods, including the use of bolts, the use of a thermally conducting adhesive that is chemically and mechanically stable at high temperature, and by casting the thermoelectric device into the engine body.

Figure 3:
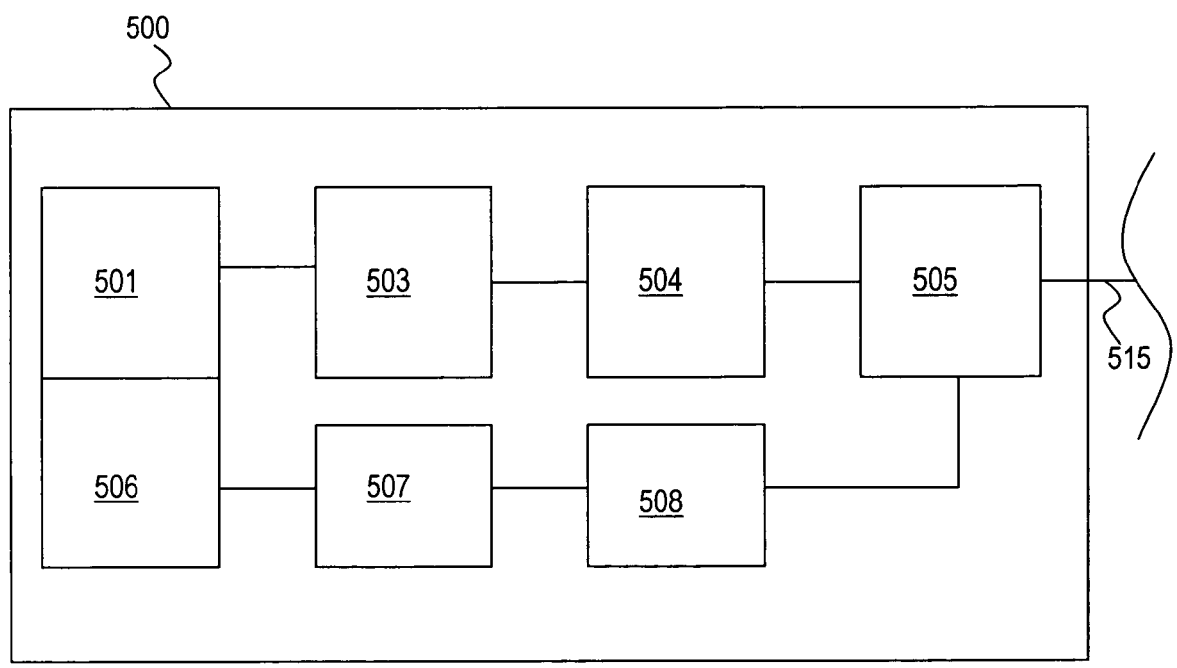
FIG. 3 shows a block diagram of an embodiment in which a Stirling engine is used as part of an electrical power generator for conversion of heat to electricity.

FIG. 3 illustrates an alternate embodiment wherein heat generated in the operation of a primary mechanism 501 of a generator 500 is converted to electricity through the use of a Stirling engine 506. In the embodiment shown in FIG. 3, the primary mechanism 501 operates to create mechanical rotation, which is converted to AC electrical energy in a first alternator 503. The alternating current is passed to a first rectifier 504 to convert the alternating current to direct current.

The operation of the primary mechanism 501 creates heat that is used by a Stirling engine 506 in thermal contact therewith to create mechanical rotation that is converted to AC electrical energy in a second alternator 507 and subsequently converted to DC electrical energy when passed through a second rectifier 508. Where the primary mechanism 501 is an ICE, heat transfer to the secondary engine 506 (in this embodiment, a Stirling engine) may occur as was described for heat transfer to a Seebeck device. That is, the Stirling engine 506 may be in contact with any of a number of locations on the ICE 501, including internal and external to the ICE 501, and any number of Stirling engines 506 may be used and specially fitted to the contour of the ICE 501. Where the primary mechanism 501 is a Stirling engine, waste heat may be transferred to a secondary Stirling engine 506 through thermal contact with the so-called low-temperature chamber of the primary Stirling engine 501, in which case the primary and secondary mechanisms of the embodiment would be serially linked Stirling engines.

In the embodiment shown in FIG. 3, the DC outputs from both the first rectifier 504 and the second rectifier 508 are combined and passed to an inverter 505, which generates a constant frequency AC output 515. Similar to the description presented above with respect to the embodiment shown in FIG. 2, by converting the waste heat produced in the operation of the primary mechanism 501 to electrical energy, the total electrical energy generation of the generator 500 is raised above that generated by the primary mechanism 501 alone.

As stated above, embodiments of the present invention do not rely on electrical power generators that are based on an internal combustion engine (ICE), as in the example embodiment shown in FIG. 2, but include electrical power generators of all types that use or produce thermal energy that can be converted to electricity. Example alternative mechanisms that may be used to power an electrical power generator and that may produce rejected thermal energy include a Stirling engine, as discussed with respect to FIG. 3, and a molten carbonate fuel cell. For an embodiment in which heat is produced that is not already converted to electricity, a method of capture of that excess heat energy for conversion to electricity, such as those methods discussed above, may be employed to add to the electrical energy output of the primary electrical energy producing mechanism, and in this way provide a potential for increased power generation efficiency of the generator.

Note that the primary energy conversion mechanism need not be based on an ICE or Stirling engine, and need not produce thermal energy as a result of a combustion process, but rather that any primary mechanism that generates electrical energy and also rejects thermal energy can be employed in an embodiment of the invention. As well, the secondary energy conversion mechanism need not be based on a thermoelectric device or a Stirling engine, but rather any secondary mechanism that generates electricity from heat can be employed in an embodiment of the invention.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An energy efficient electrical power generator comprising: a primary energy conversion mechanism for generating electrical energy, said primary mechanism being at least 20% efficient at converting its input energy into electrical energy and also rejecting thermal energy; a secondary energy conversion mechanism for generating electrical energy through the conversion to electrical energy of at least some of said rejected thermal energy, said secondary energy conversion mechanism being disposed directly on a surface of said primary energy conversion mechanism so that the at least some of said rejected thermal energy is conductively received by said secondary energy conversion mechanism; and a means to combine the electrical energy output of said primary and said secondary energy conversion mechanisms to produce an electrical power generator output at a higher efficiency, when compared with said input energy, than can be done by said primary mechanism alone.

2. The energy efficient electrical power generator of claim 1, wherein said primary energy conversion mechanism is either of an internal combustion engine or a Stirling engine.

3. The energy efficient electrical power generator of claim 1, wherein said secondary energy conversion mechanism is either of a solid state thermoelectric device or a Stirling engine.

4. An energy efficient generator for producing alternating current electrical power comprising: a first electrical power generator that generates electrical energy through the combustion of a fuel, said first electrical power generator comprising: an internal combustion engine that rejects thermal energy; an alternator; a rectifier; and an inverter; a solid state thermoelectric device that generates electrical energy, said thermoelectric device being directly connected to a surface of said engine in a manner that allows conductive heat transfer from said engine to said thermoelectric device; and an electrical circuit through which said electrical energy output from said thermoelectric device is combined with said electrical energy output from said first electrical power generator; wherein the efficiency of conversion to electrical energy of the chemical energy present in said fuel combusted by said internal combustion engine is about 30% to about 100%, when considering the electrical power produced by both of said first electrical power generator and said thermoelectric device.

5. The energy efficient generator of claim 4, wherein said electrical circuit combines DC electrical energy from said rectifier with DC electrical energy from said thermoelectric device.

6. The energy efficient generator of claim 4, wherein said thermoelectric device has a hot side and a cold side, and said hot side of said thermoelectric device is in direct contact with one of an external surface of said engine, an engine block of said engine, a cylinder head of said engine, a coolant-fluid jacket of said engine, or an exhaust manifold of said engine.

7. The energy efficient generator of claim 4, wherein said first generator is a variable speed generator.

8. The energy efficient generator of claim 4 wherein said thermoelectric device is a quantum well thermoelectric device.

9. The energy efficient generator of claim 4 wherein said internal combustion engine operates using any one of diesel fuel, a fuel meeting a "JP" standard, or both.

10. The energy efficient generator of claim 4 wherein said internal combustion engine operates using a bio-fuel.

11. The energy efficient generator of claim 4, which is designed to be transportable.

12. The energy efficient generator of claim 11, which is designed to be man-portable.

13. The energy efficient generator of claim 4, which is capable of producing a sustained output of between about 1 kW and about 10 MW of electrical power.

14. The energy efficient generator of claim 13, which is capable of producing a sustained output of between about 3 kW and about 60 kW of electrical power.

15. The energy efficient generator of claim 4, which produces an alternating current output having a frequency of any one of 50 Hz, 60 Hz, or 400 Hz.

16. The energy efficient generator of claim 1, which is designed to be transportable.

17. The energy efficient generator of claim 16, which is designed to be man-portable.

18. The energy efficient generator of claim 1, which is capable of producing a sustained output of between about 1 kW and about 10 MW of electrical power.

19. The energy efficient generator of claim 18, which is capable of producing a sustained output of between about 3 kW and about 60 kW of electrical power.

20. The energy efficient generator of claim 1, which produces an alternating current output having a frequency of any one of 50 Hz, 60 Hz, or 400 Hz.

21. A method of generating alternating current electrical power comprising the steps of: providing an internal combustion engine powered genset; converting the mechanical energy of said engine into alternating current electrical energy; providing at least one solid state thermoelectric device directly connected to a surface of said engine so that said thermoelectric conductively receives rejected thermal energy from said engine; converting said thermal energy rejected from said engine into electrical energy through said thermoelectric device; and combining said electrical energy from said thermoelectric device with said electrical energy from said engine to produce alternating current electrical power.

22. The method of claim 21 further comprising the step of: storing the electrical energy from said thermoelectric device in a battery; wherein said step of combining includes the use of a buck boost circuit to control electrical energy output from said battery.

23. The method of claim 21 further comprising the step of generating constant frequency alternating current electrical energy from direct current electrical energy, which direct current electrical energy is a combination of direct current electrical energy produced by said thermoelectric device and by said engine.

* * * * *